(12) United States Patent
Jespersen

(10) Patent No.: US 10,813,283 B2
(45) Date of Patent: Oct. 27, 2020

(54) SWATHING UNIT

(71) Applicant: Kverneland Group Kerteminde AS, Keteminde (DK)

(72) Inventor: Peter Jespersen, Vejen (DK)

(73) Assignee: KVERNELAND GROUP KERTEMINDE AS, Kerteminde (DK)

( * ) Notice: Subject to any disclaimer, the term of this patent is extended or adjusted under 35 U.S.C. 154(b) by 164 days.

(21) Appl. No.: 15/771,681

(22) PCT Filed: Sep. 26, 2016

(86) PCT No.: PCT/EP2016/072875
§ 371 (c)(1),
(2) Date: Apr. 27, 2018

(87) PCT Pub. No.: WO2017/071898
PCT Pub. Date: May 4, 2017

(65) Prior Publication Data
US 2018/0310473 A1    Nov. 1, 2018

(30) Foreign Application Priority Data

Oct. 29, 2015 (EP) .................................. EP15192106

(51) Int. Cl.
*A01D 34/49*    (2006.01)
*A01D 34/71*    (2006.01)
*A01D 57/26*    (2006.01)

(52) U.S. Cl.
CPC ............. *A01D 34/49* (2013.01); *A01D 34/71* (2013.01); *A01D 57/26* (2013.01)

(58) Field of Classification Search
CPC ...... A01D 34/49; A01D 34/125; A01D 57/26; A01D 57/28; A01D 57/30; A01D 41/1243;
(Continued)

(56) References Cited

U.S. PATENT DOCUMENTS 3,241,300 A * 3/1966 Fell ........................ A01D 82/00
                                              56/153
3,543,491 A * 12/1970 Lausch .................. A01D 43/10
                                              56/192
(Continued)

FOREIGN PATENT DOCUMENTS

EP    1008290 A1 * 6/2000 ............. A01D 43/10
EP    2710875 A1    3/2014
(Continued)

OTHER PUBLICATIONS

European Search Report issued in connection with European Application No. 15192106.1 dated Oct. 5, 2016.
(Continued)

*Primary Examiner* — Thomas B Will
*Assistant Examiner* — Joan D Misa
(74) *Attorney, Agent, or Firm* — Steven M. Shape; Dennemeyer & Associates, LLC

(57) ABSTRACT

A swathing unit (12) for an agricultural mower (4) includes at least one side deflector plate (14) that defines one side of a discharge opening (18) and is adjustable between a wide swath configuration and a narrow swath configuration. The side deflector plate (14) is attached to a pivot mechanism (30) and is angularly adjustable about a pivot axis (X) between an inner position and an outer position. The side deflector plate (14) comprises a first plate element (20) that is attached to the pivot mechanism and a second plate element (22) that is attached to the first plate element and is adjustable to adjust the overall length of the side deflector plate. The second plate element is attached to a control element (32) that cooperates with a guide element (42) to control adjustment of the length and the angular position of the side deflector plate. Movement of the control element relative to the guide element causes simultaneous adjust- (Continued)

ment of the length and the angular position of the side deflector plate (14).

16 Claims, 8 Drawing Sheets

(58) Field of Classification Search
CPC ...... A01D 82/00; A01D 34/667; A01D 43/00; A01D 43/06; A01D 43/086; A01D 34/71
See application file for complete search history.

(56) References Cited

U.S. PATENT DOCUMENTS

| | | | | |
|---|---|---|---|---|
| 3,683,602 A * | 8/1972 | Scarnato | ............. | A01D 43/107 56/14.4 |
| 3,716,972 A * | 2/1973 | Case | ............. | A01D 67/00 56/1 |
| 3,803,821 A * | 4/1974 | Peacock | ............. | A01D 57/28 56/192 |
| 3,841,070 A * | 10/1974 | Scarnato | ............. | A01D 57/28 56/14.4 |
| 3,911,649 A * | 10/1975 | Scarnato | ............. | A01D 57/28 56/1 |
| 4,099,364 A * | 7/1978 | Kanengieter | ............. | A01D 43/10 56/16.4 C |
| 5,778,647 A | 7/1998 | McLean | | |
| 5,930,988 A | 8/1999 | Hanson | | |
| 6,854,251 B2 * | 2/2005 | Snider | ............. | A01D 82/00 56/192 |
| 7,635,299 B2 * | 12/2009 | Murray | ............. | A01D 41/1243 460/111 |
| 8,925,292 B2 * | 1/2015 | Lebeau | ............. | A01D 43/107 56/16.4 A |
| 9,565,800 B2 * | 2/2017 | Fay, II | ............. | A01D 43/06 |
| 10,336,546 B2 * | 7/2019 | Dilts | ............. | A01D 41/1243 |
| 2002/0086722 A1 * | 7/2002 | Kuhn | ............. | A01D 41/1243 460/100 |
| 2006/0123764 A1 * | 6/2006 | McLean | ............. | A01D 43/04 56/350 |
| 2011/0302897 A1 * | 12/2011 | Hoffman | ............. | A01D 43/10 56/192 |
| 2014/0096498 A1 * | 4/2014 | Estock | ............. | A01D 43/06 56/192 |
| 2018/0325024 A1 * | 11/2018 | Rotole | ............. | A01D 43/10 |
| 2018/0325032 A1 * | 11/2018 | Rotole | ............. | A01D 43/102 |
| 2019/0021229 A1 * | 1/2019 | Treffer | ............. | A01D 57/16 |

FOREIGN PATENT DOCUMENTS

| | | | | |
|---|---|---|---|---|
| FR | 2855012 A1 * | 11/2004 | ........... | A01D 43/102 |
| FR | 3039966 A1 * | 2/2017 | ........... | A01D 34/667 |

OTHER PUBLICATIONS

International Search Report issued in connection with PCT Application No. PCT/EP2016/072875 dated Feb. 17, 2017.

\* cited by examiner

SWATHING UNIT

CROSS-REFERENCE TO RELATED APPLICTIONS

This is a 35 U.S.C. 371 National Stage Patent Application of International Application No. PCT/EP2016/072875, filed Sep. 26, 2016, which claims priority to European application 15192106.1, filed Oct. 29, 2015, each of which is hereby incorporated by reference in its entirety.

The present invention relates to a swathing unit for an agricultural mower, and to an agricultural mower that includes such a swathing unit.

Agricultural mowers are used for cutting crops, for example grass, alfalfa or other crops, which can then be collected and baled or chopped ready for use as animal feed, bedding, fuel or for other purposes.

An agricultural mower typically includes a mower unit having a set of rotating cutter drums or cutter discs that cut the standing crop, and a swathing unit that forms the cut crop into a swath that is deposited on the ground, so that it can subsequently be collected. The swathing unit is usually an integral part of the agricultural mower, together with the mower unit, although it may alternatively be a separate unit. The agricultural mower may also include a conditioner unit between the mower unit and the swathing unit, which bruises and crushes the stalks of the cut crop to aid wilting. The conditioner unit may be of the tine type having a plurality of flail arms mounted on a rotating bar, or it may be of the roller type having a pair of contra-rotating rollers providing a nip through which the cut crop is passed, or it may be of any other type.

The purpose of the swathing unit is to form the cut crop into a neat swath, which is laid on the ground so that it can subsequently be collected and baled or chopped. The swathing unit can usually be adjusted to control the width and shape of the swath. This allows the operator to choose either a narrow swath, which can be collected easily by a baling machine, or a wide swath that allows for more rapid drying of the cut crop as it lies on the ground. Usually, a wide swath has to be raked into a narrow swath prior to collection and it is therefore preferable to produce a narrow swath unless rapid drying of the crop is required. Typically, the narrow swath has a width equal to approximately half the cutting width of the mower unit and a wide swath has a width that is approximately equal to the full cutting width of the mower unit. These are however only rough indications of typical operating parameters: wider and narrower swaths can also be provided where required.

A known type of swathing unit includes a pair of substantially vertical side deflector plates mounted at either end of the swathing unit and a substantially horizontal rear plate that extends across the top of the swathing unit. These plates together define the size and shape of the discharge opening through which the cut crop is discharged onto the ground. Each side deflector plate is generally attached at its forward edge to a hinge, allowing the plate to pivot about a substantially vertical axis between an outer position for producing a wide swath and an inner position for producing a narrow swath. The deflector plate can be locked in the chosen position using a clamp that runs along an arcuate groove in the housing of the swathing unit as the deflector plate pivots about the hinge.

Optionally, the side deflector plate may be constructed in two parts, comprising an inner part that is attached to the hinge and an outer part that can be extended telescopically relative to the inner part. This allows the effective length of the deflector plate to be increased when it is in the inner position for producing a narrow swath. A complication of this arrangement is that adjusting the position of the side deflector plate is a time-consuming and complex process, requiring two separate steps for each deflector plate: first pivoting the plate inwards and clamping it at the chosen angle, then extending the outer part of the plate and locking it in position, typically using bolts or clamps. This is onerous and leads to operational inefficiencies. Also, the system is not readily adapted to automation, since it requires two separate actuators for adjusting the angle of the side deflector plate and the length of the plate respectively.

The rear plate that extends across the top of the swathing unit may also be attached at its forward edge to a hinge, allowing it to pivot about a substantially horizontal pivot axis. This controls the angle at which the cut crop is discharged from the swathing unit relative to the horizontal. Ideally, there should only be a small gap between the top edges of the side deflector plates and the lower surface of the rear plate, so that the shape of the swath is closely controlled. This increases the complexity of the operation to adjust the angle and length of the side deflector plates.

It is an object of the present invention to provide a swathing unit that mitigates one or more of the aforesaid disadvantages. A further object of the invention is to provide an agricultural mower including a swathing unit that mitigates one or more of aforesaid problems.

According to one aspect of the invention there is provided a swathing unit for an agricultural mower, the swathing unit including at least one side deflector plate that defines one side of a discharge opening and is adjustable between a wide swath configuration and a narrow swath configuration, wherein the side deflector plate is attached to a pivot mechanism and is angularly adjustable about a pivot axis of the pivot mechanism between an inner position and an outer position, and wherein the side deflector plate further comprises a first plate element that is attached to the pivot mechanism and a second plate element that is attached to the first plate element and is adjustable relative to the first plate element to adjust the overall length of the side deflector plate, and wherein the second plate element is attached to a control element that cooperates with a guide element to control adjustment of the length and the angular position of the of the side deflector plate, whereby movement of the control element relative to the guide element causes simultaneous adjustment of the length and angular position of the side deflector plate.

The swathing unit may include at least one side deflector plate that defines one side of a discharge opening. The side deflector plate may be adjustable between a wide swath configuration and a narrow swath configuration. The side deflector plate may attached to a pivot mechanism (for example a hinge mechanism or any other kind of pivot mechanism), preferably adjacent its forward edge, so as to be angularly adjustable about a pivot axis between an inner angular position and an outer angular position, relative to the working direction of the swathing unit. When the side deflector plate is in the inner angular position it may, for example, extend inwards at an angle in the range 30° to 60° relative to the working direction of the swathing unit, and when the side deflector plate is in the outer angular position it may, for example, extend at an angle in the range 0° to 10° relative to the working direction of the swathing unit. The side deflector plate may include a first plate element that is attached to the pivot mechanism and a second plate element that is attached to the first plate element. The second plate element may be adjustable relative to the first plate element to adjust the overall length of the side deflector plate. The overall length of the side deflector plate in the extended state may for example be in the range 105% to 180% of the length in the unextended state, typically 105% to 145%. The second plate element may be attached to a control element that cooperates with a guide element to control adjustment of the length and the angular position of the side deflector plate, and may be configured so that movement of the control element relative to the guide element causes simultaneous adjustment of both the length and the angular position of the side deflector plate.

Adjusting the side deflector plate between the wide swath configuration and the narrow swath configuration is a very simple operation, which involves adjusting the position of the control element relative to the guide element. This simultaneously adjusts both the angular position and the length of the side deflector plate and ensures that the length of the side deflector plate is adjusted proportionally with the angle of the plate. If a rear plate is provided, the invention may also provide the advantage that the spacing between the top edge of the side deflector plate and the underside of the rear plate is maintained at or near a constant value.

In an embodiment, the guide element is configured so that when the side deflector plate is in the narrow swath configuration the side deflector plate is located in the inner angular position and has an extended length, and when the side deflector plate is in the wide swath configuration the side deflector plate is located in the outer position and has an unextended length.

The pivot axis may be substantially normal to the plane of crop flow through the swathing unit, for example within 30° relative to the normal.

The length of the side deflector plate may be adjustable in a direction substantially radial to the pivot axis, for example within 30° relative to a line that is radial to the pivot axis.

In an embodiment, the first and second plate elements of the side deflector plate are telescopically adjustable.

The first and second plate elements of the side deflector plate may have similar profiles.

The first and second plate elements of the side deflector plate may be configured for sliding relative movement.

In an embodiment, the control element comprises a control pin attached to the second plate element, and the guide element comprises an elongate slot having an inner end and an outer end, wherein the control pin extends through the elongate slot and is adjustable along the length of the slot between the inner end and the outer end. However, the control element and the guide element may alternatively take different forms. For example, the control element may include a slide element that is configured to slide along a guide track, or the guide element could comprise a guide rod that the control element along so that the second plate moves relative to the first plate, or the guide element may comprise an arm or lever that guides movement of the control element.

The inner end of the guide element (i.e. the end that is closer to the centre line of the swathing unit) may be located further from the pivot axis than the outer end of the guide element, so that the length of the side deflector plate increases as the control pin is moved towards the inner end of the guide element. If the guide element takes some other form, the guide element may be configured so that when the control element is in the inner position it is located further from the pivot axis than when it is in the outer position.

In an embodiment, the guide element (e.g. an elongate slot) extends in a direction substantially perpendicular to the working direction of the swathing unit. However, it may alternatively extend at a different angle and/or it may be curved.

In an embodiment, the control element includes a locking element, for example a clamp or threaded knob, for locking it in a chosen position relative to the guide element.

In an embodiment, the control element includes an actuator for adjusting its position relative to the guide element, thus enabling automatic or semi-automatic adjustment of the side deflector plate. In this context "automatic adjustment" refers to an adjustment that is controlled by a control unit without input from an operator, and "semi-automatic adjustment" refers to an adjustment that is controlled by an operator through operating the actuator, rather than by manually adjusting the control element.

The swathing unit may include first and second side deflector plates located at opposite ends of the swathing unit, which define first and second sides of the discharge opening.

In an embodiment, the swathing unit further includes a rear plate that extends across the width of the swathing unit above the side deflector plate or plates. The rear plate may optionally be pivotably adjustable about a substantially horizontal pivot axis.

According to another aspect of the invention there is provided an agricultural mower that includes a mower unit, for example a disc mower or a drum mower, and a swathing unit according to any one of the preceding statements of invention.

The agricultural mower may further include a conditioning unit, for example a tine conditioner or a roller conditioner, that is operationally located between the mower unit and the swathing unit.

An embodiment of the invention will now be described, by way of example, with reference to the accompanying drawings, wherein:

FIG. 7b is a cross-section n line A-A of FIG. 7a;

Figure 1:
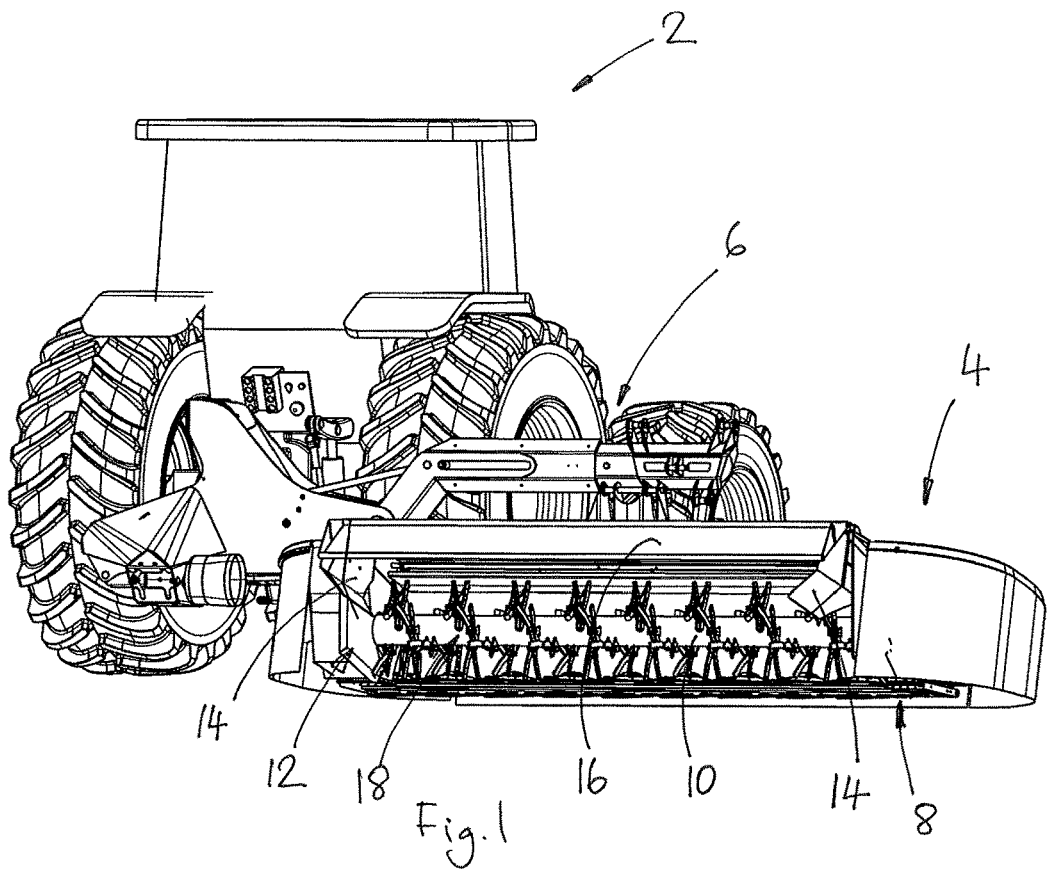
FIG. 1 is a rear isometric view of an agricultural mower attached to the rear of a tractor, with the swathing unit in a wide swath configuration.
Figure 2:
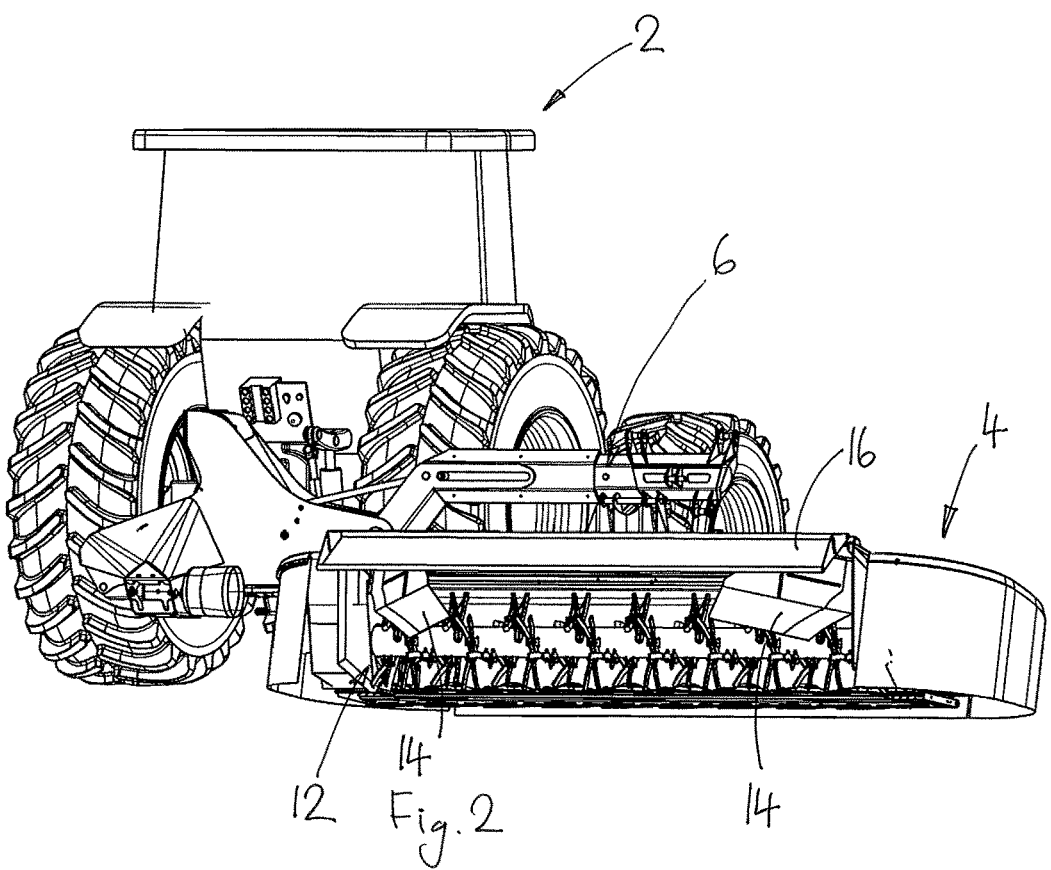
FIG. 2 is a rear isometric view of an agricultural mower attached to the rear of a tractor, with the swathing unit in a narrow swath configuration.
Figure 3:
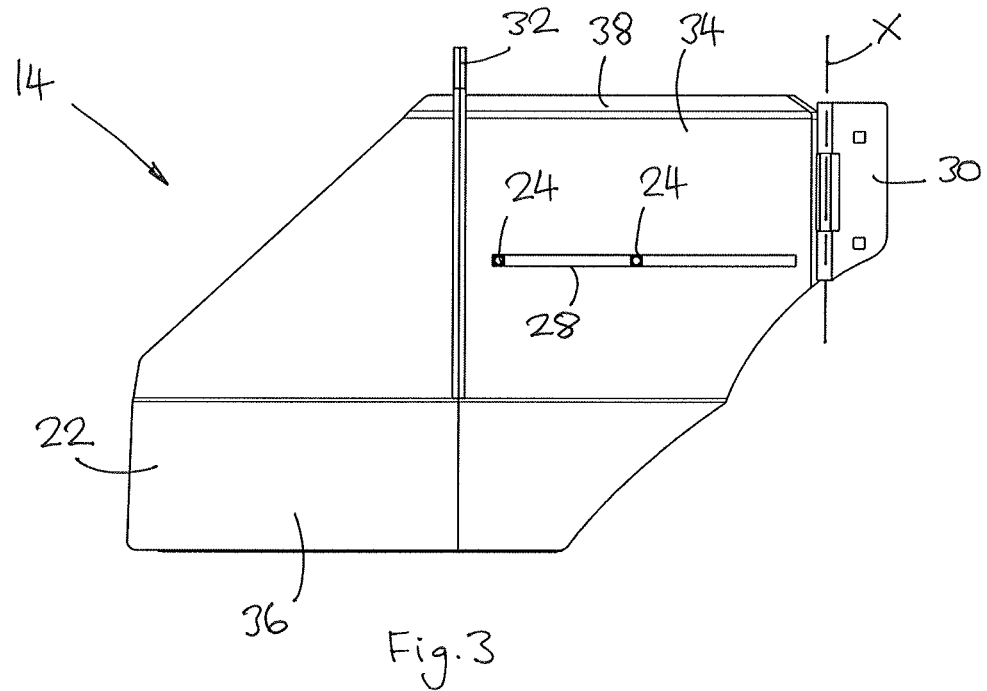
FIG. 3 is an outer side view of a side deflector plate in a wide swath configuration.
Figure 4:
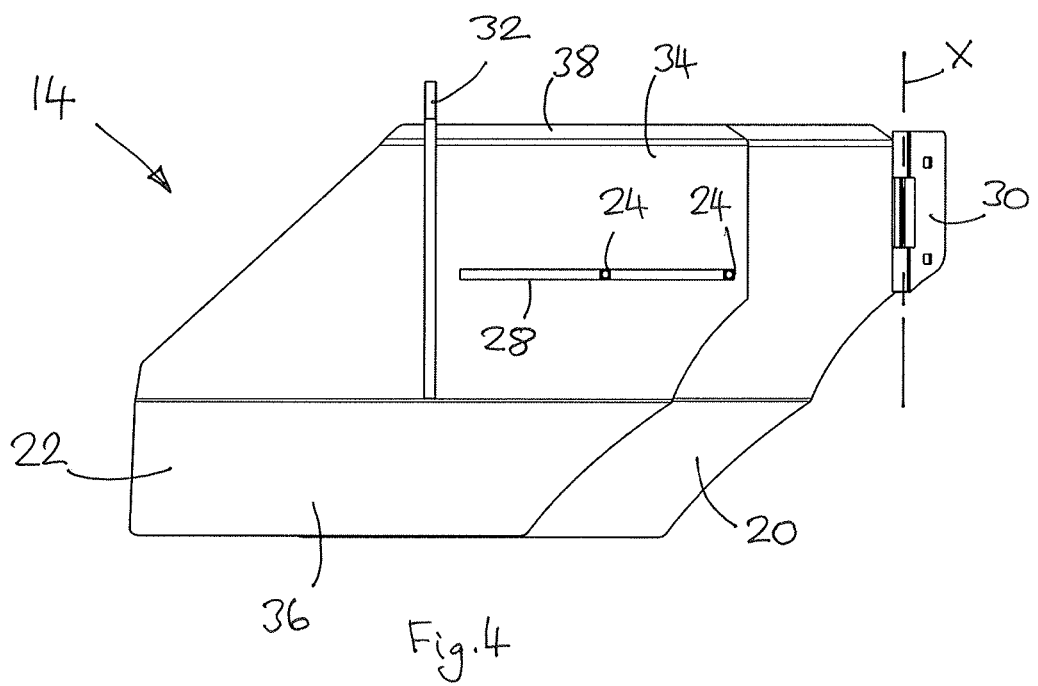
FIG. 4 is an outer side view of a side deflector plate in a narrow swath configuration.
Figure 5:
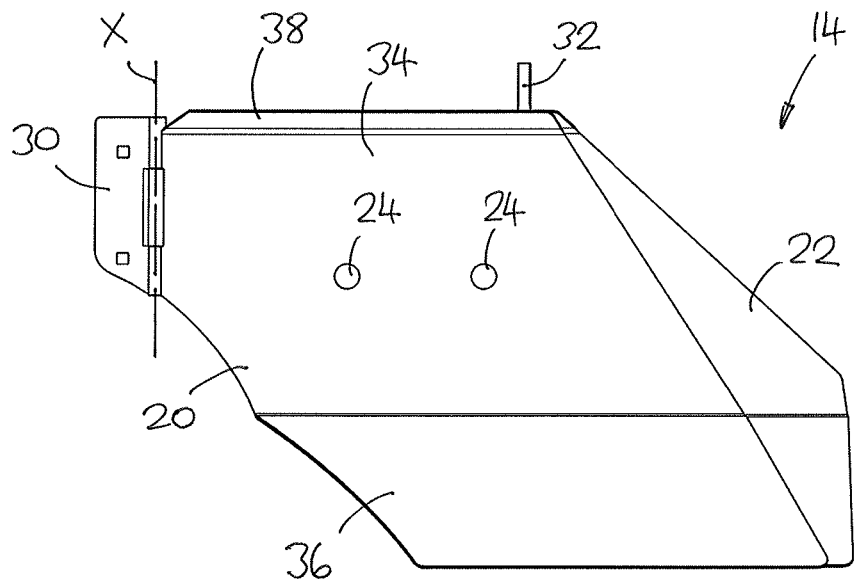
FIG. 5 is an inner side view of a side deflector plate in a wide swath configuration.
Figure 6:
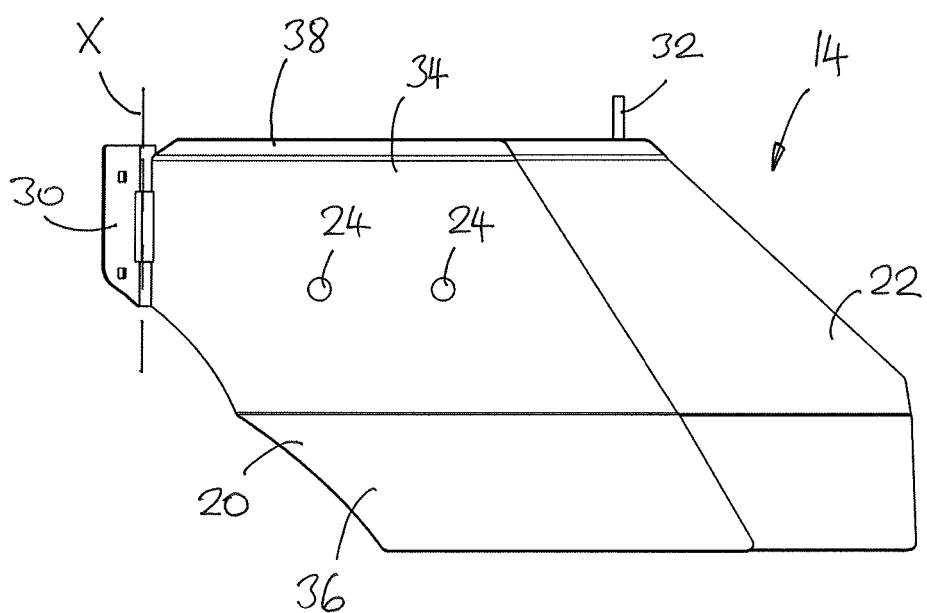
FIG. 6 is an inner side view of a side deflector plate in a narrow swath configuration.

FIGS. 1 and 2 show a tractor 2 carrying an agricultural mower 4 via a support arm and suspension assembly 6. In this embodiment the mower 4 is mounted on the rear of the tractor 2 and is positioned to one side of the tractor. It should be understood however that the mower 4 may alternatively be mounted on the tractor in a different location (for example on the front of the tractor), or used in combination with one or more mowers (for example in a butterfly configuration with mowers on both sides of the tractor), or it may be supported in numerous other ways (for example it may be trailed behind the tractor).

In this embodiment the agricultural mower 4 includes a mower unit 8 comprising, for example, a cutter bar having a plurality of rotating cutter discs, a conditioning unit 10 comprising a plurality of steel flails mounted on a rotating bar, and a swathing unit 12. The mower unit 8 and the conditioning unit 10 are conventional and so will not be described in detail. It should be understood however that both the mower unit 8 and the conditioning unit 10 may be of different types: for example, the mower unit 8 may include a set of rotating cutter drums or a sickle bar cutter comprising a set of reciprocating knives, and the conditioning unit 10 may include a pair of contra-rotating conditioning rollers.

The swathing unit 12 includes a pair of substantially vertical side deflector plates 14 mounted at opposite ends of the agricultural mower 4 and a substantially horizontal rear plate 16 that is mounted above the side deflector plates 14 and extends across the width of the mower 4. The side deflector plates 14 and the rear plate 16 together define a discharge opening 18 through which cut crop material is discharged from the agricultural mower 4, the flow of crop material through the opening 18 lying substantially in a plane. The plates 14, 16 control the width and direction of the flow of crop material and guide the discharged crop material to form a swath on the ground.

One of the side deflector plates 14 is shown in more detail in FIGS. 3 to 7. The side deflector plate 14 includes an inner plate member 20 and an outer plate member 22, which in this embodiment are connected together by a pair of bolts 24, which pass through respective bolt holes in the inner plate member 20 and an elongate slot 28 in the outer plate member 22. This mechanism allows the outer plate member 22 to slide relative to the inner plate member 20, between an unextended configuration shown in FIGS. 3 and 5 and an extended configuration shown in FIGS. 4 and 6.

The inner plate member 20 is attached to a pivot mechanism, for example comprising a hinge 30, which allows pivoting movement of the side deflector plate 14 about the pivot axis X of the hinge. In an embodiment the pivot axis is substantially normal to the plane of crop flow through the swathing unit, for example within 30° relative to the plane of crop flow. A control pin 32 is attached to the outer plate member 22. The control pin 32 may be used to adjust the position of the outer plate member 22 relative to the inner plate member 20, thereby adjusting the overall length of the side deflector plate 14 in a direction radial to the pivot axis of the hinge 30, for example within 30° relative to a line that is radial to the pivot axis.

Figure 7B:
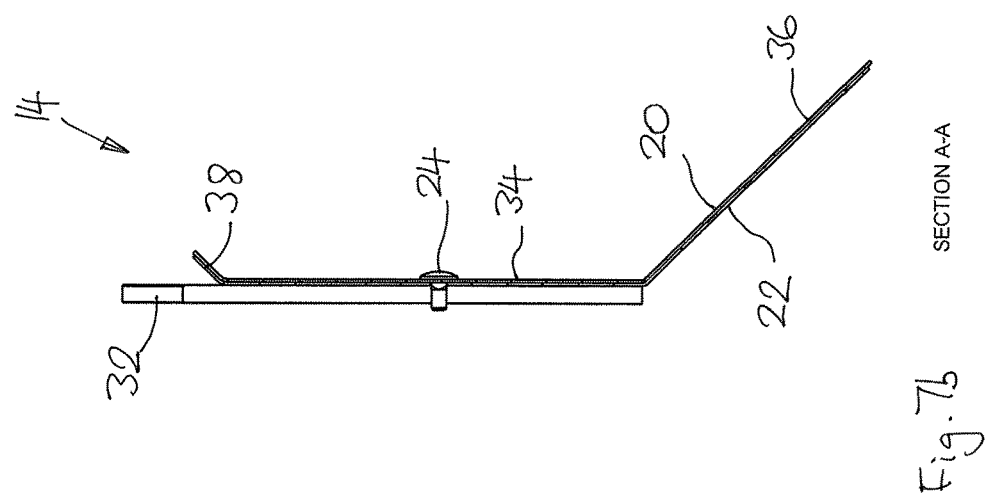
Figure 7A:
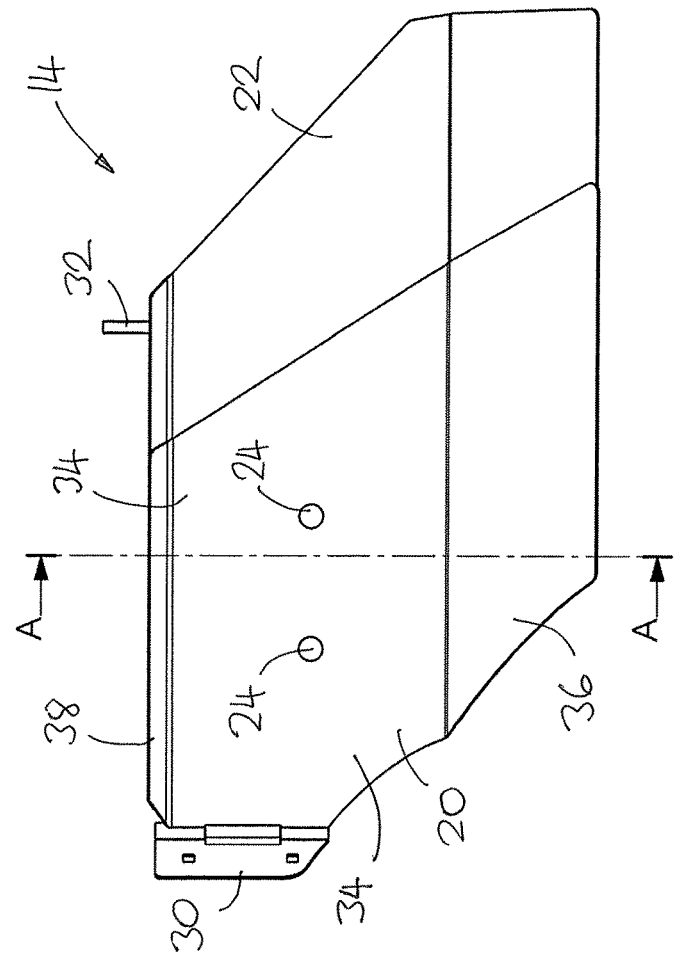
FIG. 7a is an inner side view of the side deflector plate in a narrow swath configuration.

With reference to FIG. 7b it can be seen that the side deflector plate 14 has a profile comprising a substantially vertical middle part 34, a lower part 36 that is inclined inwards (i.e. towards the centre line of the swathing unit 12) at an angle of about 45° relative to the vertical, and a small upper part 38 that is also inclined inwards at an angle of about 45° relative to the vertical. The inner and outer plate members 20, 22 both have a similar profile, allowing them to slide relative to one another in a substantially horizontal direction.

Figure 8:
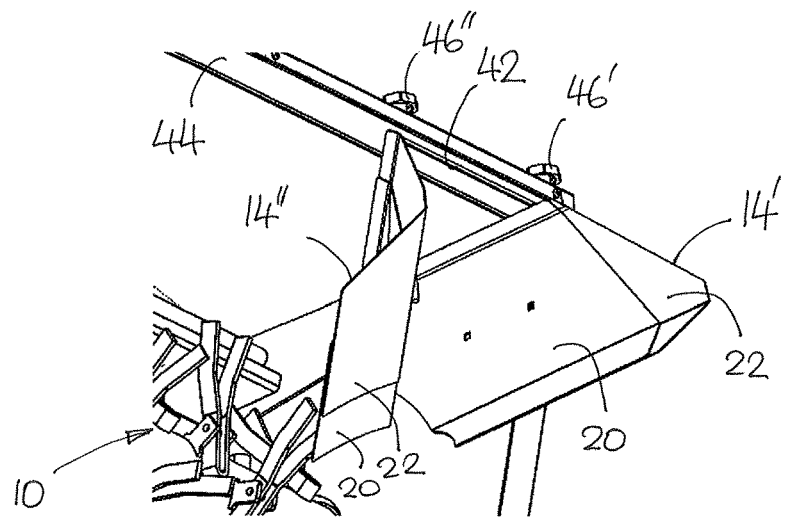
FIG. 8 is a composite isometric view from the rear of the swathing unit, showing a side deflector plate in narrow swath and wide swath configurations.
Figure 9:
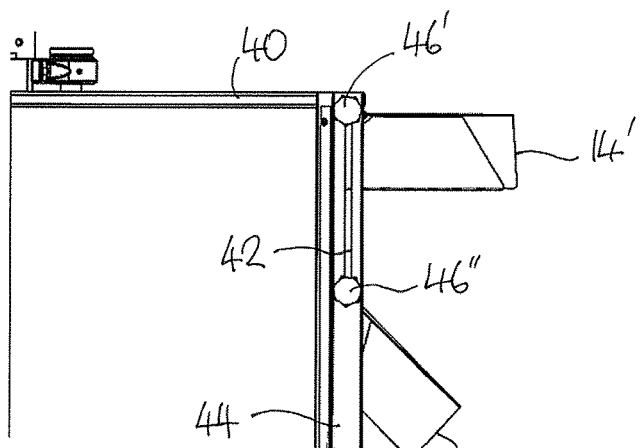
FIG. 9 is a composite view of the swathing unit from above, showing a side deflector plate in narrow swath and wide swath configurations.
Figure 10:
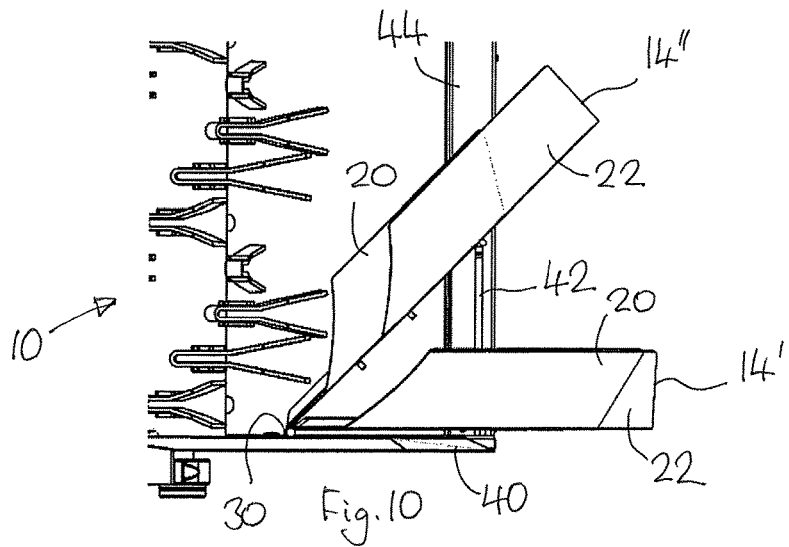
FIG. 10 is a composite view of the swathing unit from below, showing the side deflector plate in narrow swath and wide swath configurations.
Figure 11:
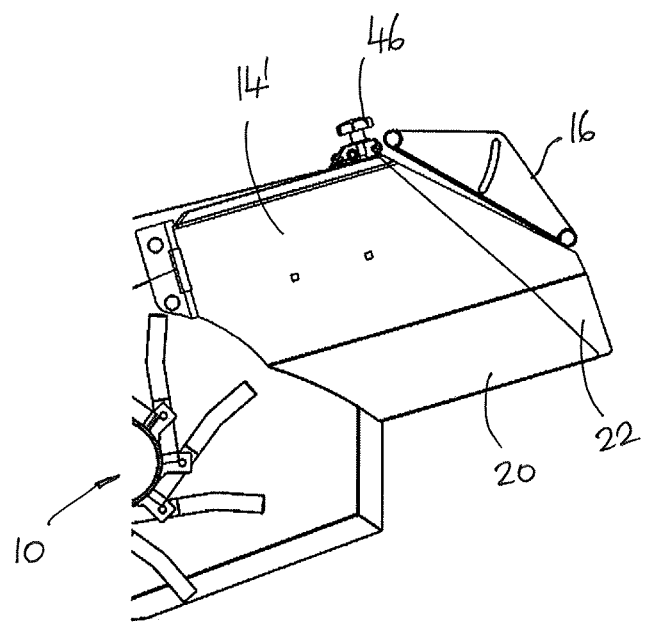
FIG. 11 is a sectional inner side view of the swathing unit showing the side deflector plate in a wide swath configuration.
Figure 12:
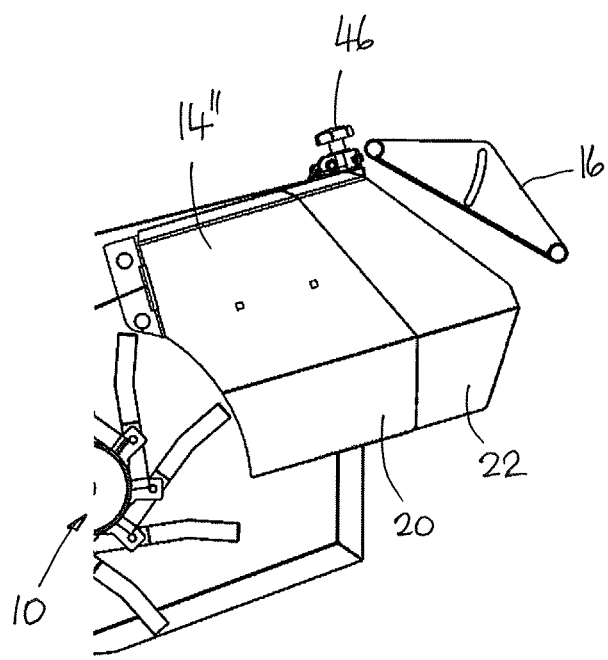
FIG. 12 is a sectional inner side view of the swathing unit showing the side deflector plate in a narrow swath configuration.
Figure 13:
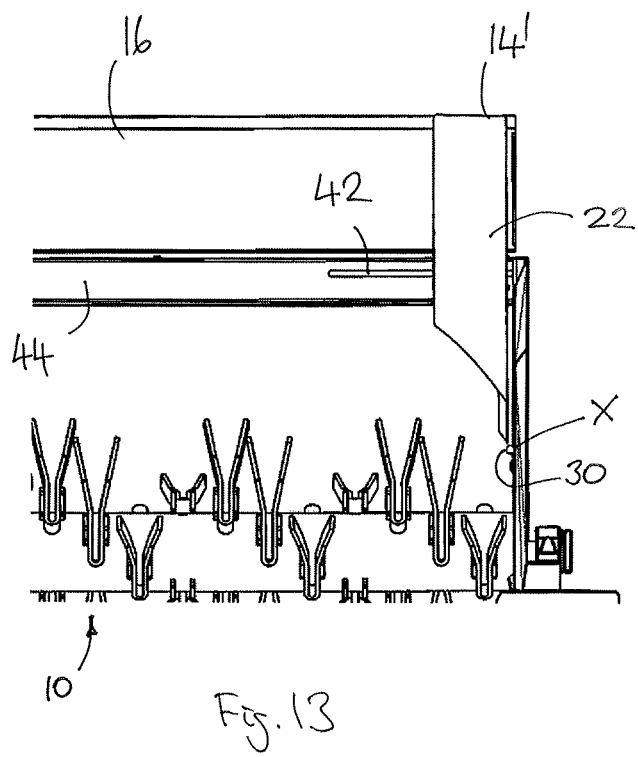
FIG. 13 is a view of the swathing unit from below showing the side deflector plate in a wide swath configuration.
Figure 14:
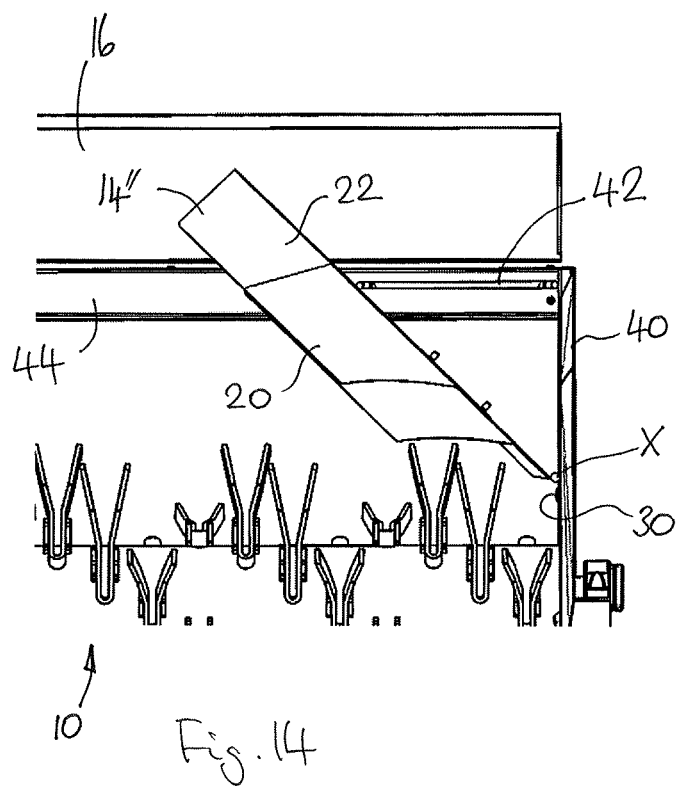
FIG. 14 is a view of the swathing unit from below showing the side deflector plate in a narrow swath configuration.

As shown in FIGS. 8 to 10, the side deflector plate 14 is attached through the hinge 30 to a side frame element 40 of the swathing unit 12. This allows the side deflector plate 14 to pivot between a wide swathing configuration 14' in which the plate is pivoted outwards to lie parallel to the side frame element 40, and a narrow swath configuration 14" in which it is pivoted inwards towards the centre line of the swathing unit 12.

The control pin 32 extends upwards through a slot 42 in an upper frame element 44 of the swathing unit 12 and is attached by a screw thread to a clamping knob 46. In this embodiment the slot 42 is straight and extends in a direction perpendicular to the working direction of the agricultural mower 4. It should be understood however that the slot 42 may alternatively be curved and/or it may be set at a different angle relative to the working direction of the agricultural mower 4.

The side deflector plate 14 may be adjusted between the wide swathing configuration 14' and the narrow swathing configuration 14" by pushing the knob 46 inwards or outwards so that the control pin 32 slides along the slot 42 between an inner position of the knob 46" and an outer position 46'. The side deflector plate 14 can then be fixed in the selected position (in either the narrow swathing configuration or the wide swathing configuration, or at an intermediate position) by turning the screw threaded clamping knob 46 to clamp the plate 14 against the upper frame element 44.

Figure 15:
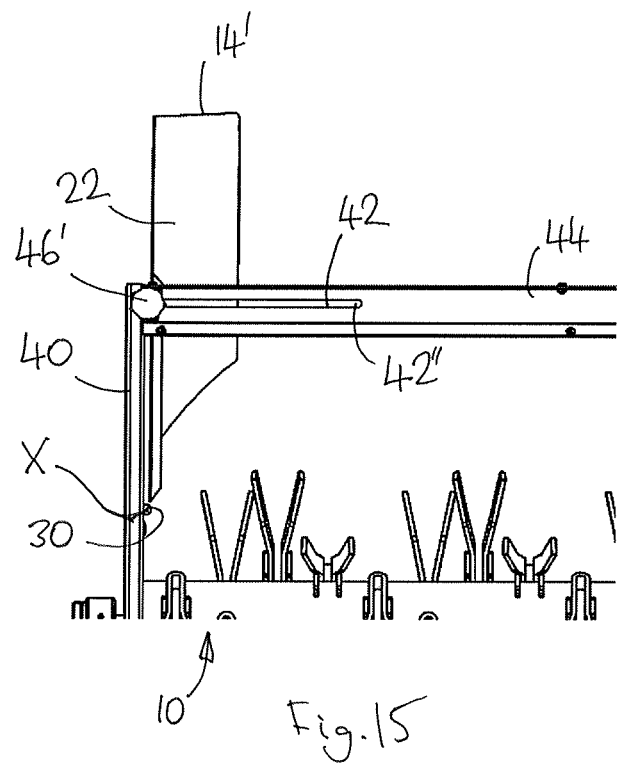
FIG. 15 is a top view of the swathing unit showing the side deflector plate in a wide swath configuration.
Figure 16:
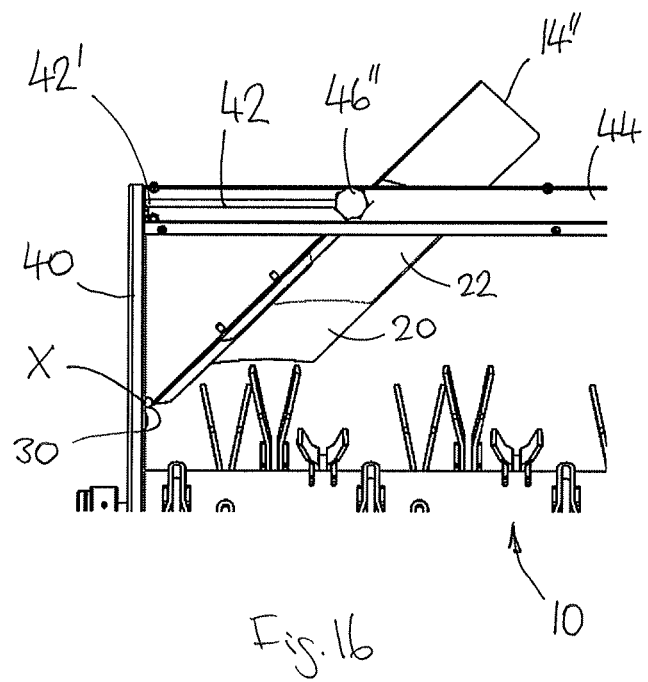
FIG. 16 is a top view of the swathing unit showing the side deflector plate in a narrow swath configuration.

Moving the control pin 32 along the slot 42 also causes sliding movement of the outer plate member 22 relative to the inner plate member 20, which changes the overall length of the side deflector plate 14 in a direction substantially radial to the pivot axis X of the hinge 30. This results from the fact that the ends of the slot 42 are not the same distance from the pivot axis X of the hinge 30. As shown most clearly in FIGS. 15 & 16, the distance from the inner end 42" of the slot 42 to the pivot axis X is greater than the distance from the outer end 42' to the pivot axis X. Therefore, when the slide deflector plate 14 is in the wide swathing configuration 14' the length of the side deflector plate is reduced, and when the side deflector plate 14 is in the narrow swathing configuration 14" the length of the plate is increased.

Adjusting the position of the side deflector plate 14 is therefore a very simple operation, involving loosening the knob 46, sliding the knob inwards or outwards as required, and then re-tightening the knob. This simultaneously adjusts both the angular position and the length of the side deflector plate 14, and ensures that the length of the side deflector plate 14 is adjusted proportionally with the angle of the plate. This provides the advantage that the spacing between the top edge of the side deflector plate 14 and the underside of the rear plate 16 is maintained at or near a constant value.

A further advantage of this arrangement is that it can be easily adapted to automatic or semi-automatic operation, using a linear actuator such as a hydraulic ram to adjust the position of the control pin 32. Only a single actuator is then required to adjust both the angle and the length of the side deflector plate 14.

The invention claimed is:

1. A swathing unit for an agricultural mower, the swathing unit comprising a side deflector plate that at least partially defines a first side of a discharge opening and is adjustable between a wide swath configuration and a narrow swath configuration, wherein the side deflector plate is attached to a pivot mechanism and is angularly adjustable about a pivot axis of the pivot mechanism between an inner position and an outer position, and wherein the side deflector plate comprises a first plate element attached to the pivot mechanism and a second plate element attached to the first plate element and adjustable relative to the first plate element to adjust a length of the side deflector plate, and wherein the second plate element is attached to a control element that cooperates with a guide element to control adjustment of the length and an angular position of the side deflector plate, wherein the guide element guides movement of the control element relative to the guide element to cause simultaneous adjustment of the length and the angular position of the side deflector plate.

2. A swathing unit according to claim 1, wherein the guide element is configured so that when the side deflector plate is in the narrow swath configuration the side deflector plate is located in the inner position and has an extended length, and when the side deflector plate is in the wide swath configuration the side deflector plate is located in the outer position and has an unextended length.

3. A swathing unit according to claim 1, wherein the pivot axis is substantially normal to a plane of crop flow through the swathing unit.

4. A swathing unit according to claim 1, wherein the length of the side deflector plate is adjustable in a direction substantially radial to the pivot axis.

5. A swathing unit according to claim 1, wherein the first plate element and the second plate element are telescopically adjustable.

6. A swathing unit according to claim 1, wherein the first plate element and the second plate element have similar profiles.

7. A swathing unit according to claim 1, wherein the first plate element and the second plate element are configured for sliding relative movement.

8. A swathing unit according to claim 1, wherein the control element comprises a control pin attached to the second plate element, and the guide element comprises an elongate slot having an inner end and an outer end, wherein the control pin extends through the elongate slot and is adjustable along a length of the elongated slot between the inner end and the outer end.

9. A swathing unit according to claim 8, wherein the inner end of the elongate slot is located farther from the pivot axis than the outer end of the elongate slot.

10. A swathing unit according to claim 8, wherein the elongate slot extends in a direction substantially perpendicular to a working direction of the swathing unit.

11. A swathing unit according to claim 1, wherein the control element comprises a locking element for locking the control element in a chosen position relative to the guide element.

12. A swathing unit according to claim 1, wherein the control element comprises an actuator for adjusting a position of the control element relative to the guide element.

13. A swathing unit according to claim 1, wherein the first deflector plate and the second deflector plate are located at opposite ends of the swathing unit, which define a first side and an opposite second side of the discharge opening.

14. A swathing unit according to claim 1, further comprising a rear plate that extends across a width of the swathing unit above the side deflector plate.

15. An agricultural mower comprising a mower unit and a swathing unit, the swathing unit comprising a side deflector plate that at least partially defines a first side of a discharge opening and is adjustable between a wide swath configuration and a narrow swath configuration, wherein the side deflector plate is attached to a pivot mechanism and is angularly adjustable about a pivot axis of the pivot mechanism between an inner position and an outer position, and wherein the side deflector plate comprises a first plate element attached to the pivot mechanism and a second plate element attached to the first plate element and adjustable relative to the first plate element to adjust a length of the side deflector plate, and wherein the second plate element is attached to a control element that cooperates with a guide element to control adjustment of the length and an angular position of the side deflector plate, wherein the guide element is configured to guide movement of the control element relative to the guide element to cause simultaneous adjustment of the length and the angular position of the side deflector plate.

16. An agricultural mower according to claim 15, further comprising a conditioning unit operationally located between the mower unit and the swathing unit.

* * * * *